UNITED STATES PATENT OFFICE.

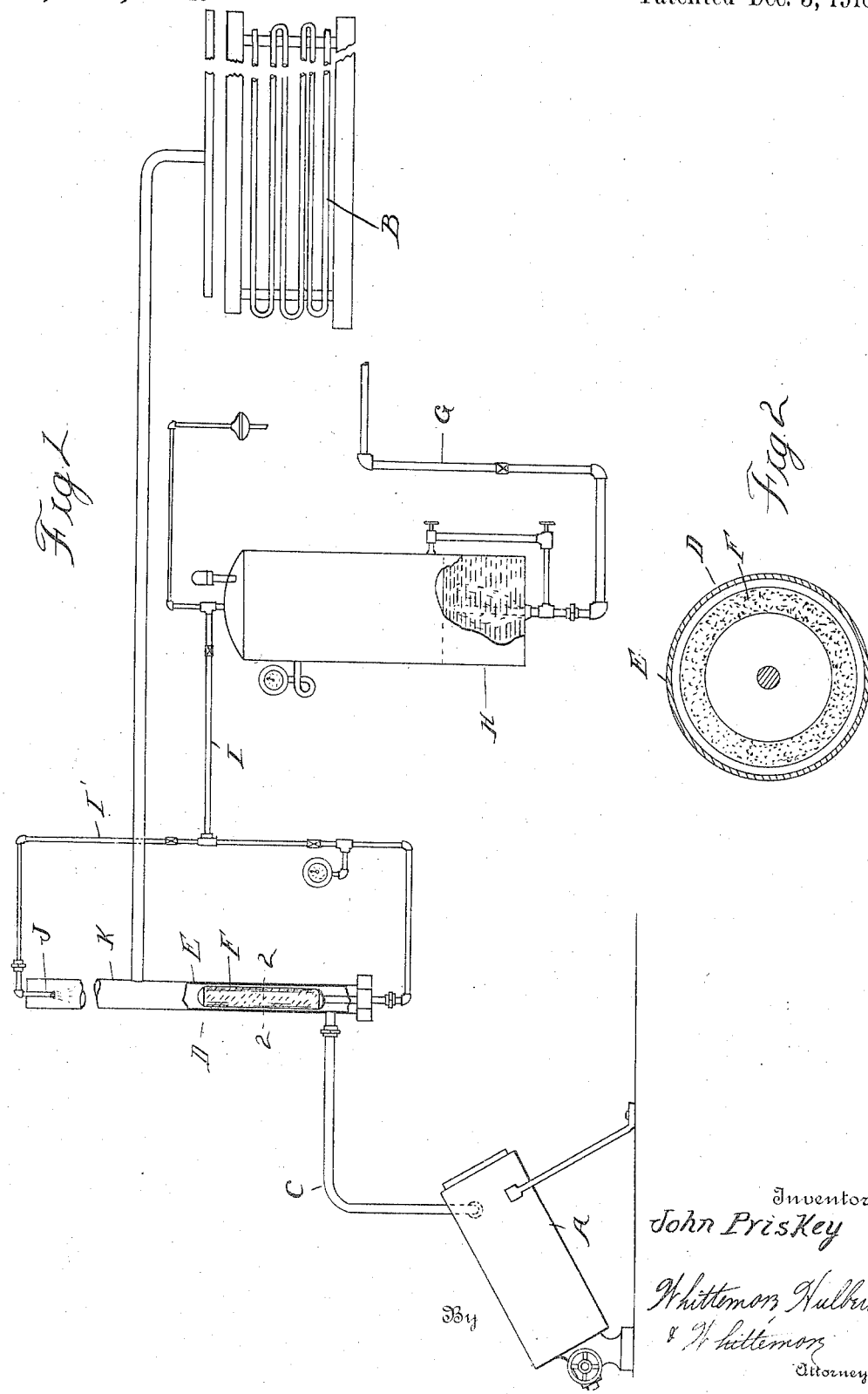

JOHN PRISKEY, OF DETROIT, MICHIGAN.

METHOD AND APPARATUS FOR DEODORIZING CREAM.

1,286,404. Specification of Letters Patent. Patented Dec. 3, 1918.

Application filed September 7, 1917. Serial No. 190,262.

*To all whom it may concern:*

Be it known that I, JOHN PRISKEY, a citizen of the United States of America, residing at Detroit, in the county of Wayne and State of Michigan, have invented certain new and useful Improvements in Methods and Apparatus for Deodorizing Cream, of which the following is a specification, reference being had therein to the accompanying drawings.

The invention relates to apparatus for handling milk and cream and has particular reference to the means for deodorizing the cream, and to this end the invention comprises the novel construction as hereinafter set forth.

In the drawings:

Figure 1 is a diagram of the apparatus; Fig. 2 is a cross-section on line 2—2 Fig. 1.

A is the pasteurizer and B is the cooler of a cream-handling apparatus, the cream being conveyed from one to the other through a conduit C. D is my improved deodorizer, which is preferably arranged in the conduit C so as to operate intermediate the pasteurizer and cooler. The deodorizer comprises essentially an outer receptacle or holder E, within which is arranged a hollow porous body F connected with a source of compressed, purified air. As shown the air is supplied through a conduit G, being first passed through a washer H for purifying it and removing dust, and then passing through a conduit I to the member F. The member F will be completely immersed in the cream, and therefore the compressed air which passes through the pores of the body will be forced in minute bubbles into the cream and will rise therethrough, effecting deodorization. On account of the viscous character of the cream this treatment would produce a froth, resulting in considerable waste. This I have prevented by a bubble-breaking device, comprising a downwardly-directed air nozzle J arranged in an upward extension K of the casing E which is above the cream outlet. The nozzle J is supplied with compressed air through a branch conduit I', and in operation the downward blast of air will break the bubbles and prevent rising of the froth.

By reason of the fact that the space within the holder E outside of the porous body F is comparatively thin, all of the cream passing therethrough will be subjected to the action of the air.

With the apparatus described, a very thorough deodorizing of the cream is produced, for the member F may be formed of material having pores of any desired degree of fineness so that the mixing of the air with the cream is very intimate.

What I claim as my invention is:

1. An apparatus for deodorizing cream, comprising a container for the cream, a hollow porous body immersed in the cream within said container, means for forcing compressed air through said hollow porous body into the cream, and means for breaking the froth bubbles.

2. An apparatus for deodorizing cream comprising a container for the cream, a hollow porous body immersed in the cream within said container, means for forcing compressed air through said porous body and into the cream, and a downwardly-directed air-jet for breaking the froth bubbles.

3. An apparatus for deodorizing cream, comprising means for continuously feeding the cream, a container forming a part of the cream conduit, a hollow porous body immersed in the cream within said container, means for forcing compressed air through said hollow body into the cream, and an air jet in the upper portion of said container directed downward and serving to break the froth bubbles.

4. An apparatus for deodorizing cream, comprising a container for the cream, a body immersed in the cream within said container and formed with a multiplicity of minute outlets, means for forcing compressed air into said body, and means for breaking the froth bubbles.

5. An apparatus for deodorizing cream, comprising a container for the cream, a hollow porous body immersed in the cream within said container, a restricted passage being formed between said body and container, and means for forcing compressed air through said porous body and into the cream.

6. An apparatus for deodorizing cream, comprising a container for the cream, a body immersed in the cream within said container and formed with a multiplicity of minute outlets, means for forcing compressed air into said body and for inducing a flow of the cream through said container between the interior wall thereof and the exterior wall of said immersed body.

In testimony whereof I affix my signature.

JOHN PRISKEY.